June 2, 1931. J. HICKEY 1,808,166
WATER HEATER
Filed April 30, 1930 3 Sheets-Sheet 2
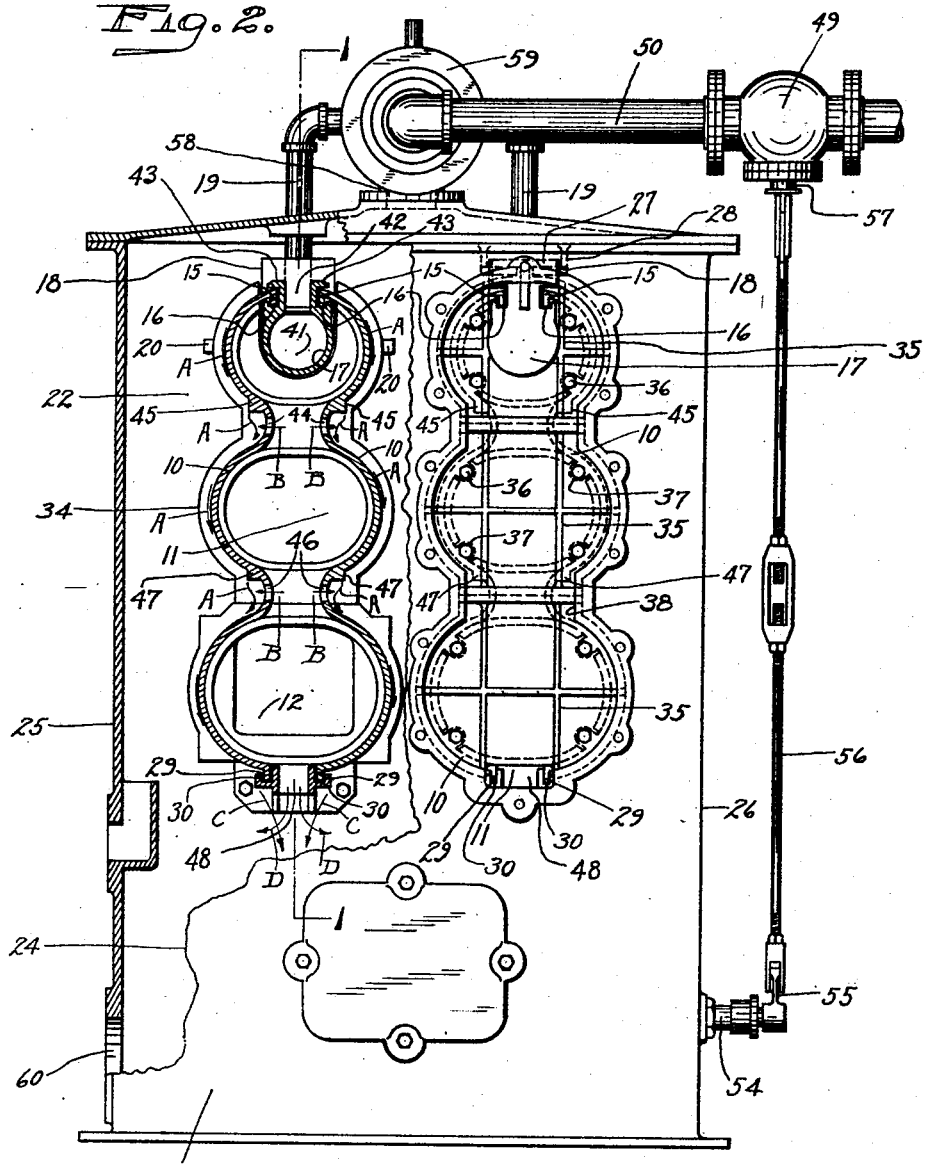
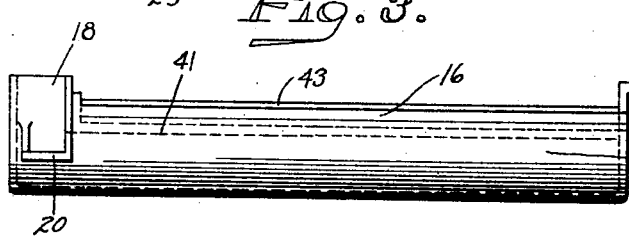
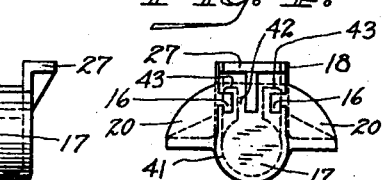

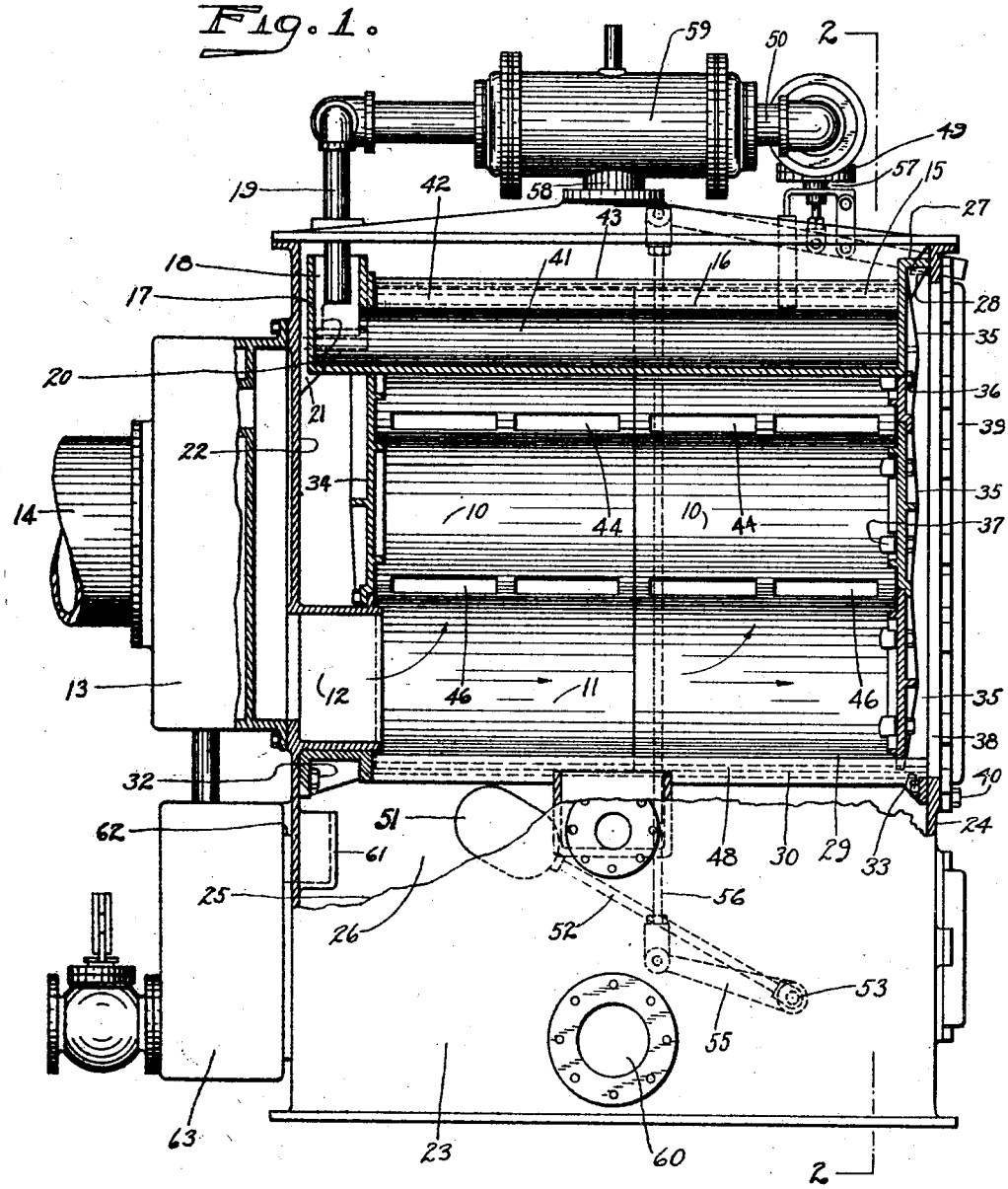

June 2, 1931.     J. HICKEY     1,808,166
WATER HEATER
Filed April 30, 1930     3 Sheets-Sheet 3
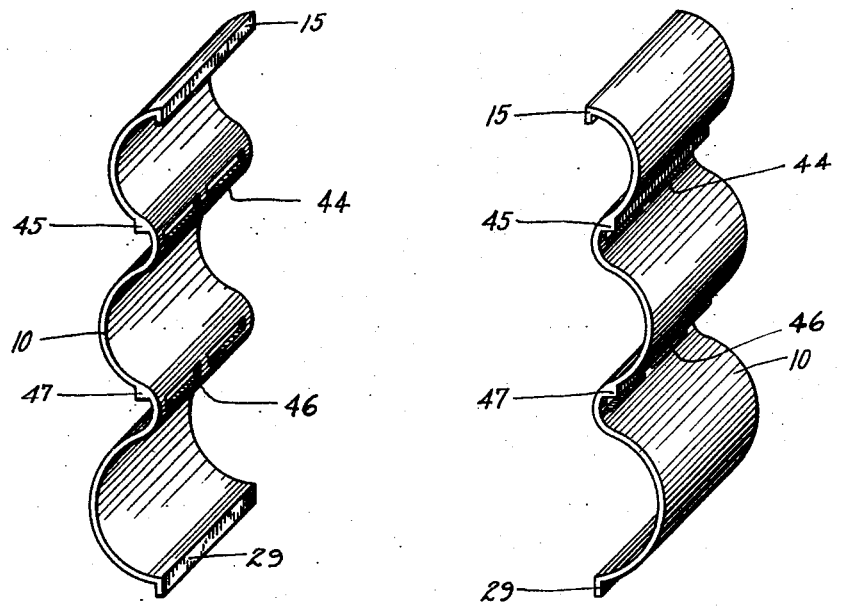
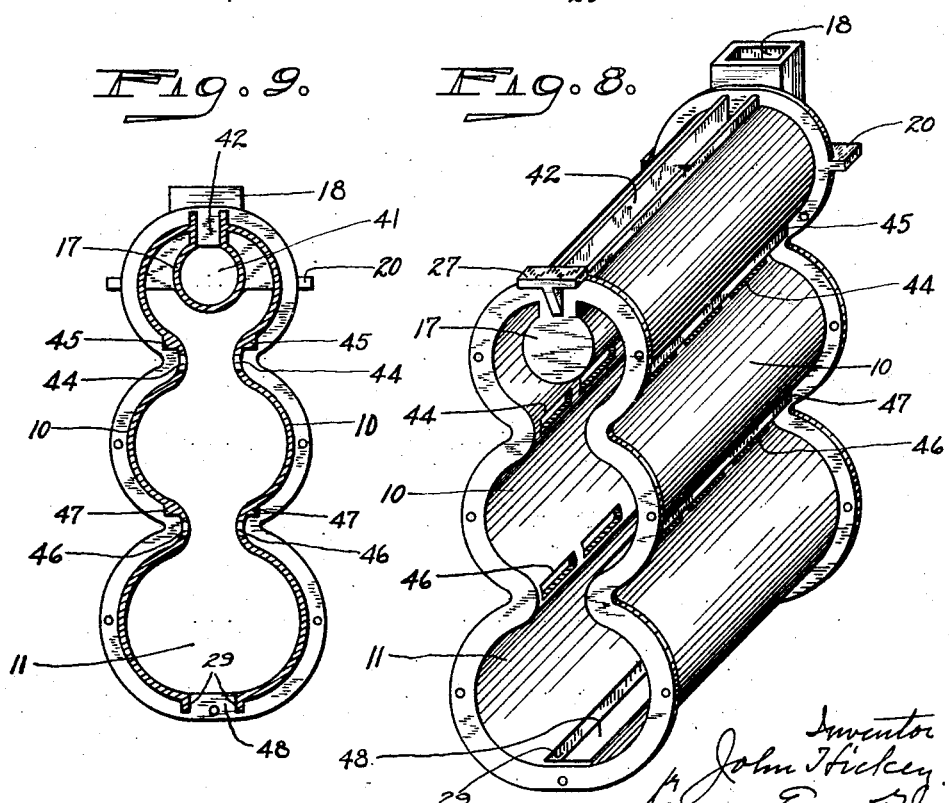

Patented June 2, 1931

1,808,166

UNITED STATES PATENT OFFICE

JOHN HICKEY, OF NEW HAVEN, CONNECTICUT, ASSIGNOR TO THE NATIONAL PIPE BENDING COMPANY, OF NEW HAVEN, CONNECTICUT, A CORPORATION

WATER HEATER

Application filed April 30, 1930. Serial No. 448,536.

This invention relates to an improvement in heaters, and particularly to heaters employing steam for heating boiler-feed-water, though not so limited.

The main object of this invention is to produce a simple and reliable heater constructed with particular reference to transferring the maximum amount of heat from the steam to the water.

A further object of this invention is to produce a heater in which the water will be directly agitated by the steam in such manner that not only will the same surrender the maximum amount of heat to the water, but the water so heated will be substantially freed of dissolved air or other corrosive gases.

With the above and other objects in view, as will appear from the following, my invention consists in a water-heater characterized by its provision with a substantially vertical water-apron, means for supplying water to the upper end of the said apron for downward flow by gravity over one side thereof, means for supplying steam to the opposite side of the said water-apron for heating the said apron, and hence the water, and one or more steam-ports extending laterally through the said water-apron from the steam-side thereof to the water-side thereof for insuring the direct contact of the steam with the water.

My invention further consists in a water-heater characterized as above and having certain other details of construction and combinations of parts as will be hereinafter described and particularly recited in the claims.

In the accompanying drawings:

Fig. 1 is a view of a water-heater embodying my invention, partly in side elevation and partly in vertical longitudinal section, on the line 1—1 of Fig. 2;

Fig. 2 is a view thereof, partly in end elevation and partly in transverse section, on the line 2—2 of Fig. 1, the cover-plate of the right-hand heating unit being removed;

Fig. 3 is a detached view in side elevation of the cold-water trough;

Fig. 4 is an end view thereof;

Fig. 5 is a detached view in side elevation of the apron-supporting bar;

Fig. 6 is an end view thereof;

Fig. 7 is a detached perspective view of a pair of complementary water-aprons;

Fig. 8 is a detached perspective view of a modified form of heating-unit in which the cold-water trough and apron are formed integral, the end plates being removed; and Fig. 9 is a transverse sectional view thereof.

In the embodiment of my invention herein chosen for illustration in Figs. 1 to 7 inclusive, I employ two corresponding heating-units, so that a description of one will serve for both, though each unit will bear like reference characters.

Each heating-unit comprises four water-apron sections 10 arranged in opposed pairs and of corrugated or undulating form in vertical section, as clearly shown in Figs. 2 and 7 of the drawings, two apron-sections being arranged end-to-end on each of the opposite sides of a heating-unit, so as to form between the said pairs a steam-chamber 11, into the lower end of which steam is fed from an inlet-duct 12 leading out of an oil-separator 13 or steam-manifold as desired and fed by a steam-inlet-pipe 14.

The upper end of each of the water-aprons 10 is formed with a downwardly-turned suspension-flange 15 fitting into a longitudinal groove 16, one of which is formed upon each of the respective opposite sides of a cold-water feed-trough 17 provided at one end with a vertically-projecting inlet-neck 18 into which a cold-water supply-pipe 19 depends. Projecting laterally outward from each of the respective opposite sides of the inlet-neck 18 is a suspension-ear 20 resting upon a bracket 21 inwardly-projecting from one end-wall 22 of a rectangular tank or housing generally designated by the numeral 23 and comprising also an end-wall 24 opposite the end-wall 22 already referred to and a pair of complementary side-walls 25 and 26.

For the support of the end of the cold-water trough 17 opposite its inlet-neck 18 I form the said trough with an outwardlyturned flange 27 resting upon a bracket 28 inwardly-projecting from the end-wall 24 already described.

The respective lower ends of each of the water-aprons 10 are each formed with a downwardly-projecting flange 29 seated in an upwardly-opening longitudinal groove 30, one of which is formed upon each of the respective opposite sides of a supporting-bar 31 secured at one end by means of bolts 32 to the end-wall 22 of the tank 23, and at its opposite end secured by means of bolts 33 to the end-wall 24 thereof, as clearly shown in Fig. 1 of the drawings.

The steam-chamber 11 formed by the two opposed pairs of water-aprons 10 is closed (at its left-hand end, as viewed in Fig. 1), with the exception of the space required for the inlet-duct 12, by means of a head-plate 34, while its opposite end is closed by a series of three head-plates 35 secured to the ends of the right-hand pair of opposed water-aprons by means of bolts 36 threaded into bosses 37 inwardly-projecting therefrom, as shown in Fig. 1.

The end-wall 24 of the tank or housing 23 is formed with an opening 38 (Figs. 1 and 2) in line with each of the heating-units and so proportioned that the head-plates 35 may be unbolted from the adjacent ends of the water-aprons 10, after which the water-apron sections may be slid longitudinally through the grooves 16 and 30, in the cold-water trough 17 and supporting-bar 31 respectively, outward through the said opening for inspection, repair or replacement. Normally, the opening 38 in the end-wall of the tank or housing 23 is closed by a cover-plate 39 secured thereto by bolts 40.

The water-chamber 41 of the cold-water trough 17 is of general cylindrical form in cross-section, as shown in Fig. 2, and is intersected by a substantially-coextensive longitudinal overflow-passage 42 extending upward therefrom and flanked on either side by a longitudinally-arranged laterally-projecting drip-flange 43 overhanging each of the grooves 16 in the trough-structure and hence overhanging the upper end of the adjacent water-aprons 10.

For the purpose of providing for direct contact between the steam and the water, as will hereinafter appear, I provide the water-aprons 10 at the low-point, between the topmost and intermediate undulations thereof, with longitudinally-arranged slot-like steam-ports 44 providing a flow-passage for the escape of steam laterally outward from the steam-chamber 11. Slightly to one side and above each of the steam-ports 44 just referred to is a longitudinal drip-ledge 45 functioning in the manner as will hereinafter appear to break up the film of water flowing over the outer surface of the aprons.

Similarly, the low-point between the intermediate and the lowermost undulations or swellings in the opposed aprons 10 is formed with longitudinally-arranged slot-like steam-ports 46, above each of which is a drip-ledge 47 corresponding in location and function to the drip-ledges 45 just above described.

Supplementing the action of the steam-ports 44 and 46 in providing for the direct contact of the steam, from within the chamber 11, with the film of water flowing over the exterior of the water-aprons 10, is a vertical egress-passage 48 formed in the supporting-bar 31 and functioning as will hereinafter be described.

In the operation of my improved water-heater, cold-water is admitted into the inlet-neck 18 of the cold-water trough 17 from the cold-water inlet-pipe 19 under the control of an inlet-control valve 49 installed in the cold-water supply-pipe 50. The valve 49 just referred to is preferably opened and closed to control the flow of water into the heater in response to changes of water-level in the bottom of the tank or housing 23 by means of a float 51 located within the lower end of the said tank and mounted upon the outer end of an arm 52 secured to a rock-shaft 53 journalled in a stuffing-box-fitting 54 mounted in the side-wall 26 of the tank and provided at its outer end with a lever-arm 55 connected by means of an adjustable link 56 with the stem 57 of the said cold-water inlet-control valve 49.

The cold water thus admitted into the neck 18 of the cold-water trough 17 will fill the cylindrical chamber 41 thereof and flow upward through the overflow passage 42, thence outward in opposite directions over the oppositely-extending drip-flanges 43 and downward in a thin film over the exterior undulating surface of the steam-chamber 11 formed by the outer faces of the respective water-aprons 10.

As the water flows downward, as above described, over the outer surface of the aprons, it will ultimately reach the uppermost of the sharp-edged drip-ledges 45 and will be thereby broken into a fine spray falling therefrom in the general direction of the arrows A of Fig. 2 and directly into the path of steam flowing outward through the adjacent steam-ports 44 in the direction of the arrows B (Fig. 2), whereby not only does the water absorb heat directly from the steam flowing outward from the steam-chamber 11 but its turbulence is thereby increased, with the effect of releasing a large percentage of such dissolved air or other corrosive gases as the water may contain.

The air or gases thus released, together with a small amount of steam, flows outward from the upper end of the tank or housing, through a vent-pipe 58 surrounded by a vent-surface-condenser 59 or other suitable device for condensing any steam that may tend to escape from the tank.

After passing the uppermost steam-ports 44 in the side-walls of the heating-unit as above described, the water will continue its flow downward over the intermediate outwardly-bowed portions of the water-aprons 10 and will again be broken into a fine spray by means of the second series of drip-ledges 47 located to one side and directly above the lower series of steam-ports 46 opening laterally outward through the walls of the said water-aprons 10 from the steam-chamber 11. Here the intermingling of the steam and water will again occasion the further liberation of dissolved air or gases.

Ultimately, the water flowing downward over the outer surfaces of the water-aprons will drip off of the lower edge of the supporting-bar 31 in the general direction of the arrows C (Fig. 2) and will here again be brought into direct contact with steam flowing downward and laterally outward from the steam-chamber 11 through the vertically-arranged longitudinal egress-passage 48 in the said supporting-bar in the general direction of the arrows D (Fig. 2).

By means of my invention not only is the water heated by being spread out in a thin flowing film over the outer surfaces of the water-aprons 10, which are heated by the steam within the chamber 11, but periodically the said descending film of water is broken into a fine spray and brought into direct contact and admixture with the cross current of steam flowing outward through the ports 44, 46 and 48.

The described direct contact between the steam and water not only serves to more efficiently transfer the heat from the steam to the water, but serves, in conjunction with the drip-ledges 45 and 47, to so agitate the water that the same is caused to surrender its almost inevitable content of dissolved air or other corrosive gases, which, when thus released, will escape upward through the vent-pipe 58, while the gas-freed and heated water will drop into the lower end of the tank or housing 23 for being drawn off as required through a hot-water outlet-port 60. To provide for the automatic escape of hot water contained in the bottom of the tank or housing 23 should the level therein rise unduly for any reason, I employ an overflow trough 61 projecting into the interior of the said casing and having an overflow-port 62 leading into a trap 63 of any approved type.

Instead of forming the complementary opposed water-aprons 10, constituting a heating-unit separate from each other and from the cold-water trough 17, I may, as shown in Figs. 8 and 9, form the said parts integral to form a unitary structure, particularly well shown in Fig. 8.

It will be understood by those skilled in the art that my invention may assume varied physical forms without departing from my inventive concept, and I, therefore, do not limit myself to the specific embodiments herein chosen for illustration, but only as indicated in the appended claims.

I claim:

1. In a water-heater, the combination with a substantially-vertical water-apron; of means for supplying water to the upper edge of the said apron for downward flow by gravity over one side thereof; means for supplying steam to the opposite side of the said water-apron for heating the said apron and hence the water; and one or more steam-ports extending laterally through the said water-apron from the steam-side thereof to the water-side thereof for insuring the direct contact of the steam with the water.

2. In a water-heater, the combination with a substantially-vertical water-apron; of means for supplying water to the upper edge of the said apron for downward flow by gravity over one side thereof; means for supplying steam to the opposite side of the said water-apron for heating the said apron and hence the water; one or more steam-ports extending laterally through the said water-apron from the steam-side thereof to the water-side thereof for insuring the direct contact of the steam with the water; and a drip-ledge located on the water-side of the said apron above the said steam-ports therein for breaking up the film of water, preparatory to its direct contact with the steam emerging from the said ports.

3. In a water-heater, the combination with a substantially-vertical water-apron of undulating form in cross-section; means for supplying water to the upper end of the said undulating water-apron for the downward flow by gravity over one side therof; means for supplying steam to the opposite side of the said undulating water-apron for heating the said apron and hence the water; and one or more steam-ports extending laterally through the said undulating water-apron from the steam-side thereof to the water-side thereof for insuring the direct contact of the steam with the water.

4. In a water-heater, the combination with a substantially-vertical water-apron of undulating form in cross-section; means for supplying water to the upper end of the said undulating water-apron for the downward flow by gravity over one side thereof; means for supplying steam to the opposite side of the said undulating water-apron for heating the said apron and hence the water; one or more steam-ports extending laterally through the said undulating water-apron from the steam-side thereof to the water-side thereof for insuring the direct contact of the steam with the water; and drip-ledges located on the water-side of the said undulating water-apron above the said steam-ports therein for breaking up the film of water, preparatory to its direct contact with the steam emerging from the said ports.

5. In a water-heater, the combination with a substantially-vertical water-apron of undulating form in cross-section; means for supplying water to the upper end of the said undulating water-apron for the downward flow by gravity over one side thereof; means for supplying steam to the opposite side of the said undulating water-apron for heating the said apron and hence the water; and one or more steam-ports extending laterally through the said undulating apron from the steam-side thereof to the water-side thereof and located at the low points of the undulations thereof for insuring the direct contact of the steam with the water.

6. In a water-heater, the combination with a substantially-vertical water-apron of undulating form in cross-section; means for supplying water to the upper end of the said undulating water-apron for the downward flow by gravity over one side thereof; means for supplying steam to the opposite side of the said undulating water-apron for heating the said apron and hence the water; one or more steam-ports extending laterally through the said undulating apron from the steam-side thereof to the water-side thereof and located at the low points of the undulations thereof for insuring the direct contact of the steam with the water; and drip-ledges located on the water-side of the said undulating water-apron above the said steam-ports therein for breaking up the film of water, preparatory to its direct contact with the steam emerging from the said ports.

7. In a water-heater, the combination with a pair of substantially-vertical complementary water-aprons arranged to form a steam-chamber between them; means for supplying water to the upper ends of the said water-aprons for downward flow by gravity over the outer surfaces thereof; means for supplying steam to the said steam-chamber for heating the said aprons and hence the water; and one or more steam-ports extending laterally through the said water-aprons from the said steam-chamber formed thereby for insuring the direct contact of the steam with the water.

8. In a water-heater, the combination with a pair of substantially-vertical complementary water-aprons arranged to form a steam-chamber between them; means for supplying water to the upper ends of the said water-aprons for downward flow by gravity over the outer surfaces thereof; means for supplying steam to the said steam-chamber for heating the said aprons and hence the water; one or more steam-ports extending laterally through the said water-aprons from the said steam-chamber formed thereby for insuring the direct contact of the steam with the water; and drip-ledges located on the outer surface of the said water-aprons above the said steam-ports therein for breaking up the film of water flowing thereover, preparatory to its direct contact with the steam emerging from the said ports.

9. In a water-heater, the combination with a pair of substantially-vertical complementary water-aprons of undulating or corrugated form in cross-section and arranged to form a steam-chamber between them; means for supplying water to the upper ends of the said undulating water-aprons for downward flow by gravity over the outer surfaces thereof; means for supplying steam to the said steam-chamber for heating the said undulating aprons and hence the water; and one or more steam-ports extending laterally through the said undulating water-aprons from the said steam-chamber formed thereby for insuring the direct contact of the steam with the water.

10. In a water-heater, the combination with a pair of substantially-vertical complementary water-aprons of undulating or corrugated form in cross-section and arranged to form a steam-chamber between them; means for supplying water to the upper ends of the said undulating water-aprons for downward flow by gravity over the outer surfaces thereof; means for supplying steam to the said steam-chamber for heating the said undulating aprons and hence the water; one or more steam-ports extending laterally through the said undulating water-aprons from the said steam-chamber formed thereby for insuring the direct contact of the steam with the water; and drip-ledges located on the outer surface of the said water-aprons above the said steam-ports therein for breaking up the film of water flowing thereover, preparatory to its direct contact with the steam emerging from the said ports.

11. In a water-heater, the combination with a pair of substantially-vertical complementary water-aprons of undulating or corrugated form in cross-section and arranged to form a steam-chamber between them; means for supplying water to the upper ends of the said undulating water-aprons for downward flow by gravity over the outer surfaces thereof; means for supplying steam to the said steam-chamber for heating the said undulating aprons and hence the water; and one or more steam-ports extending laterally through the said water-aprons from the steam-chamber therein and located at the low points in the said undulating aprons for insuring the direct contact of the steam with the water.

12. In a water-heater, the combination with a pair of substantially-vertical complementary water-aprons of undulating or corrugated form in cross-section and arranged to form a steam-chamber between them; means for supplying water to the upper ends of the said undulating water-aprons for downward flow by gravity over the outer surfaces thereof; means for supplying steam to the said steam-chamber for heating the said undulating aprons and hence the water; one or more steam-ports extending laterally through the said water-aprons from the steam-chamber therein and located at the low points in the said undulating aprons for insuring the direct contact of the steam with the water; and drip-ledges located on the outer surface of the said undulating water-aprons above the said steam-ports therein for breaking up the film of water flowing thereover, preparatory to its direct contact with the steam emerging from the said ports.

In testimony whereof, I have signed this specification.

JOHN HICKEY.